(12) United States Patent
Crain

(10) Patent No.: US 10,506,771 B2
(45) Date of Patent: Dec. 17, 2019

(54) MODULAR HYDROPONIC SYSTEM

(71) Applicant: Dominic Crain, Casselberry, FL (US)

(72) Inventor: Dominic Crain, Casselberry, FL (US)

( * ) Notice: Subject to any disclaimer, the term of this patent is extended or adjusted under 35 U.S.C. 154(b) by 241 days.

(21) Appl. No.: 15/783,288

(22) Filed: Oct. 13, 2017

(65) Prior Publication Data

US 2019/0110416 A1    Apr. 18, 2019

(51) Int. Cl.
*A01G 31/06* (2006.01)
*A01G 31/00* (2018.01)

(52) U.S. Cl.
CPC ........ *A01G 31/06* (2013.01); *A01G 2031/006* (2013.01)

(58) Field of Classification Search
CPC .. A01G 2031/006; A01G 31/02; A01G 31/06; A01G 9/022; A01G 9/023; A01G 9/024; A01G 27/001; A01G 27/003; A01G 27/005; A01G 9/02; A01G 9/14; A01G 9/24; A01G 9/247; A01G 31/045; Y02P 60/216
See application file for complete search history.

(56) References Cited

U.S. PATENT DOCUMENTS

| | | | |
|---|---|---|---|
| 4,419,843 A * | 12/1983 | Johnson, Sr. | .......... A01G 9/023 47/82 |
| 6,470,625 B1 | 10/2002 | Byun | |
| 6,840,008 B1 * | 1/2005 | Bullock | ................. A01G 9/023 47/82 |
| 7,243,460 B2 | 7/2007 | Darlington | |
| 8,418,403 B1 | 4/2013 | Nuttman | |
| 8,756,860 B1 | 6/2014 | Murphy | |
| 9,101,099 B2 | 8/2015 | Nagels et al. | |
| 9,468,154 B2 * | 10/2016 | Carpenter | .............. A01G 9/023 |
| 9,591,814 B2 * | 3/2017 | Collins | .................. A01G 31/02 |
| 9,622,427 B2 | 4/2017 | Wagner | |
| 10,136,587 B1 * | 11/2018 | Johnson | ................. A01G 9/088 |
| 10,306,847 B2 * | 6/2019 | Whitcher | ................. A01G 2/20 |
| 2010/0146854 A1 * | 6/2010 | Cannon | .................. A01G 9/023 47/82 |
| 2014/0000162 A1 * | 1/2014 | Blank | .................... A01G 31/06 47/62 A |
| 2014/0208647 A1 * | 7/2014 | Carpenter | .............. A01G 9/023 47/66.7 |
| 2015/0223418 A1 * | 8/2015 | Collins | .................. A01G 31/02 47/62 R |

* cited by examiner

*Primary Examiner* — Trinh T Nguyen

(74) *Attorney, Agent, or Firm* — William M. Hobby, III

(57) ABSTRACT

A hydroponic growing system uses a plurality of vertically supported pots suspended one above the other, each pot being removably held on a supporting ring attached to a plurality of vertically extending chains, or the like, supported from above. The hydroponic growing system includes a water delivery system which feeds the water to the top-most pot which drains to each next pot and to a bottom reservoir where it may be pumped back into the water delivery system.

18 Claims, 7 Drawing Sheets

MODULAR HYDROPONIC SYSTEM

FIELD OF THE INVENTION

This invention relates to a hydroponic growing system having a water/nutrient delivery system and especially to a modular hydroponic growing system having a plurality of removably supported pots suspended vertically one above the other, each pot being removably held on a supporting pot ring.

BACKGROUND OF THE INVENTION

The implementation of hydroponic systems has several advantages over traditional farming: 1) it can produce much higher crop yields in the same footprint of traditional farming, 2) it supersedes the concerns and constraints of soil health, 3) it can be installed in places where agriculture or gardening is difficult or impossible, 4) it uses less water, 5) it has faster growth and relative freedom from soil diseases and weeds, and finally, 6) it provides more consistent crops. In addition, a system configured with automation results in less labor, cost, and maintenance.

Hydroponic systems have two basic structural designs: a horizontal and a vertical configuration. The horizontal structure requires a larger footprint and features a tray which supplies the nutrient rich solution. These systems generally rely on a static solution culture where the plant roots are immersed in the solution. A possible drawback to this implementation is that the roots may not be exposed to sufficient oxygen which may reduce the plant yield. A solution to this drawback is the nutrient film technique (NFT) or ebb and flow (also know as flood and drain). NFT suspends the plants so the roots of the plant hang down in a hole where a shallow stream or "film" of water runs across the root tips. The problem with NFT is that if the structure tips or the water pump fails, the plants will die quickly because there is no media to hold water. The ebb and flow method uses a reservoir to hold the nutrient solution and above the reservoir is a tray or chamber that holds the plant and media. A pump will take the nutrient solution from the reservoir and flood the tray or chamber until the media can absorb the appropriate amount of solution. It will then drain back into the reservoir. The problem with the ebb and flow is the possible height restrictions with the plants due to the elevation of the reservoir trays. Mineral build-up can cause a nutrient lockout, which can cause a nutrient deficiency.

The vertical structure hydroponic system has a small footprint allowing multiple plants to grow in a perpendicular orientation to the ground. Thus, the systems take advantage of vertical space to increase plant density. They generally employ a drip to catch system (gravity feed) to deliver nutrients to the plants. The nutrient drip is emitted at the top of the container stack and flows through each container to supply nutrients to the crop. The plants are grown in a media that will support the plant and allow unrestricted nutrient drip flow. These systems can have a constant feed or timed dripped configuration. There are a number of design constraints that need to be addressed in a vertical stacked hydroponic system: 1) the installation area needs to be on a prepped surface, 2) there isn't a simple way to replace a container within the assembled stack without disassembling the stack, 3) and the time consumed in the initial setup.

What is needed is a configurable modular hydroponics system that is designed for simplicity and sustainability. The system features should include: installation for multiple terrains, simple and quick installation, standalone or matrix configurations, drip to catch or drip recirculate configuration, electric or solar configuration, indoor or outdoor configurations and efficient relocation capabilities.

Prior art hydroponic systems can be seen in the Nagels et al. U.S. Pat. No. 9,101,099 for a hydroponic growing system using a plurality of pots suspended one above the other on cables hanging downwardly from a frame and including water and light delivery systems. The Darlington U.S. Pat. No. 7,243,460 is for a support for vertical hydroponic plants matrix. The Nuttman U.S. Pat. No. 8,418,403 is for hanging stacked plant holders and watering systems. The Collins et al. U.S. Pat. No. 9,591,814 teaches a lightweight modular adjustable vertical hydroponic growing system for cultivation of plants. The Wager U.S. Pat. No. 9,622,427 is for a hydroponic system for growing plants which uses a bamboo tower having a grow chamber with a water chamber formed therein. The U.S. Patent to Byun, U.S. Pat. No. 6,470,625 is for a seedling raising device for aerial seed collection of farm products while the U.S. Patent to Murphy, U.S. Pat. No. 8,756,860, is for a plant hanger with a watering system.

The present modular sustainable hydroponics system is designed to automate a hydroponic system. The system can be quickly setup to accommodate different situations and environments. It can enable consistent food accessibility and diversity down to a household level in rural and/or urban settings. In addition, it can be configured to function indoors or outdoors and installed for perpetual or temporary projects. The system is non-invasive to the landscape and only requires a pair of posts placed in the ground. The system can be assembled and disassembled quickly and can be installed virtually anywhere without destroying crops.

SUMMARY OF THE INVENTION

A hydroponic growing system uses a plurality of vertically supported pots suspended one above the other, each pot being removably held on a supporting ring attached to a plurality of vertically extending chains, or the like, supported from above. The hydroponic growing system includes a water and nutrient delivery system which feeds the water to the top-most pot which drains to each next pot and to a bottom reservoir where it may be pumped back into the water delivery system.

The modular hydroponic system includes a plurality of pot supporting rings with each ring suspended vertically on a plurality of lines, such as cable or chain lines, in a spaced relationship to each other. Each pot of a plurality of plant growing pots has a rim or lip shaped to fit onto one of the plurality of suspended rings and is removably held in the suspended ring. Each pot has a discharge therefrom into the next lower suspended pot with the last suspended pot discharging into a water reservoir where it is collected for pumping back to the top-most pot for recycling. A water emitter is positioned above the top-most of the plurality of plant growing pots for discharging water thereinto with any excess water being let out through the discharge into the next lower pot. This allows for a hydroponic system with a plurality of vertically supported spaced plant growing pots to be easily removed from the operating hydroponic growing system while the system is in operation.

BRIEF DESCRIPTION OF THE DRAWINGS

The accompanying drawings, which are included to provide further understanding of the invention, are incorporated in and constitute a part of the specification and illustrate an embodiment of the invention and together with the description serve to explain the principles of the invention.

In the drawings.

DETAILED DESCRIPTION OF AN EXEMPLARY EMBODIMENT

Figure 1:
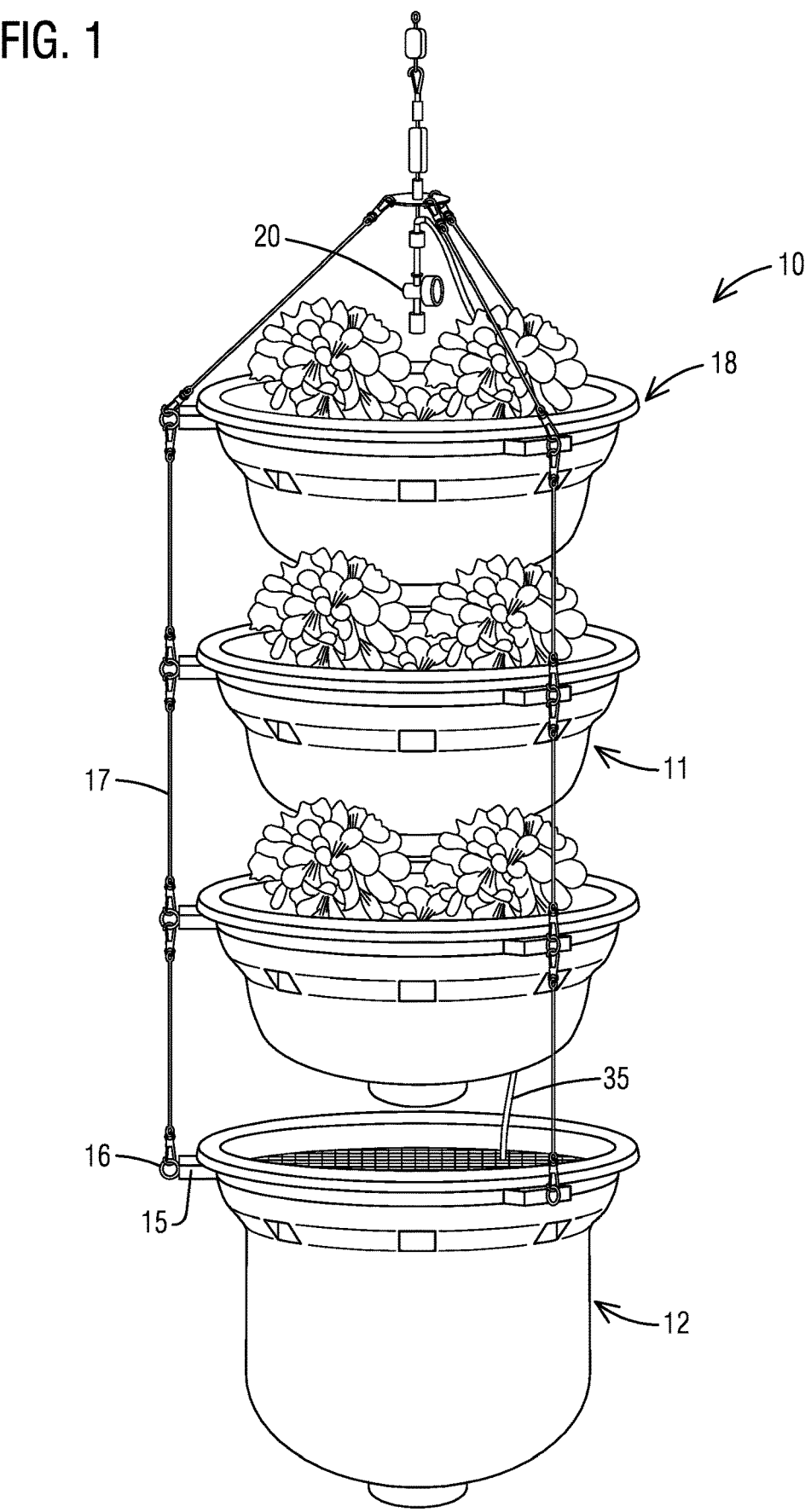
FIG. 1 is a perspective view of one module of a hydroponic system in accordance with the present invention.
Figure 2:
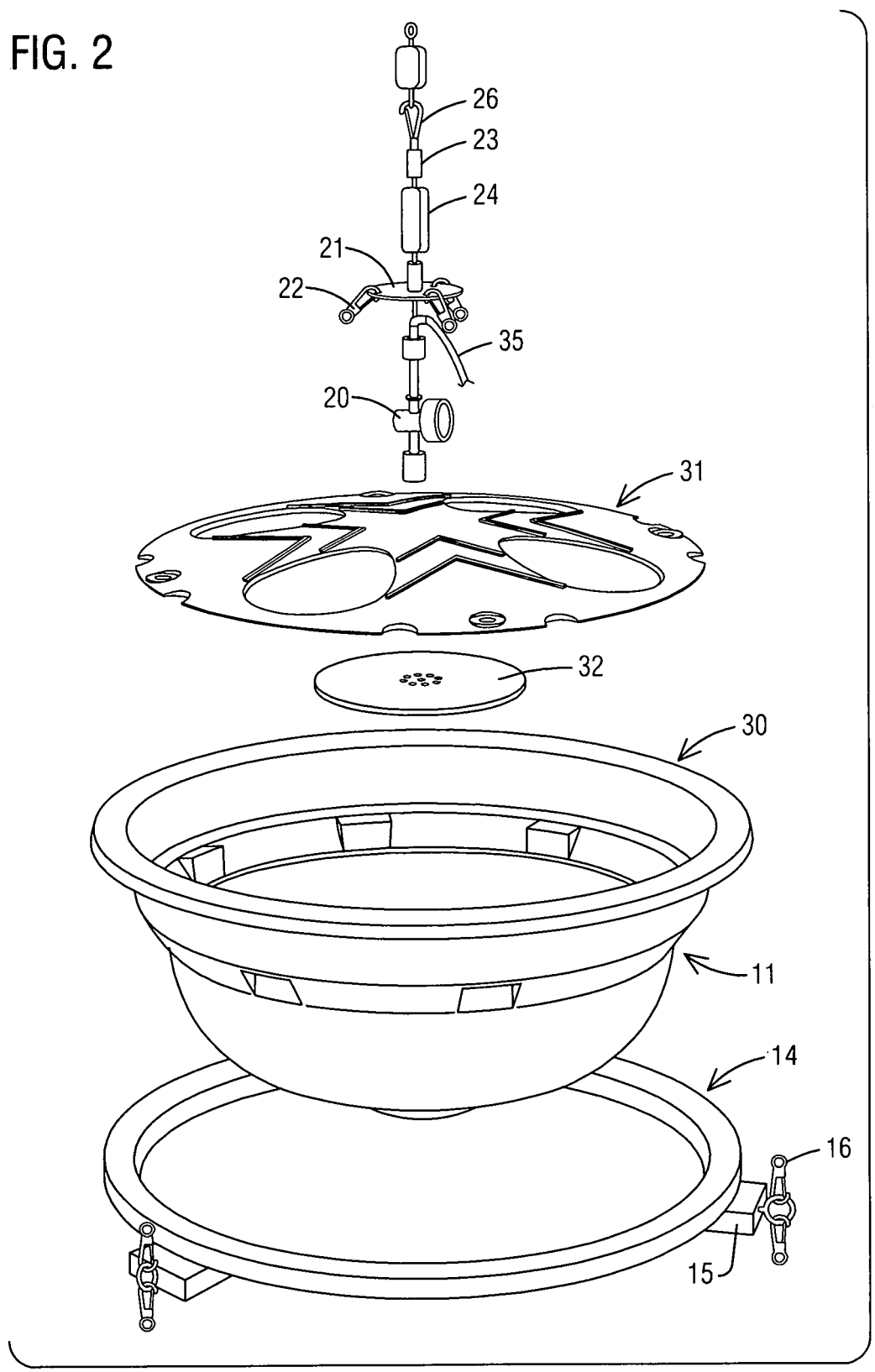
FIG. 2 is an exploded perspective of one of the growing pots of FIG. 1.
Figure 3:
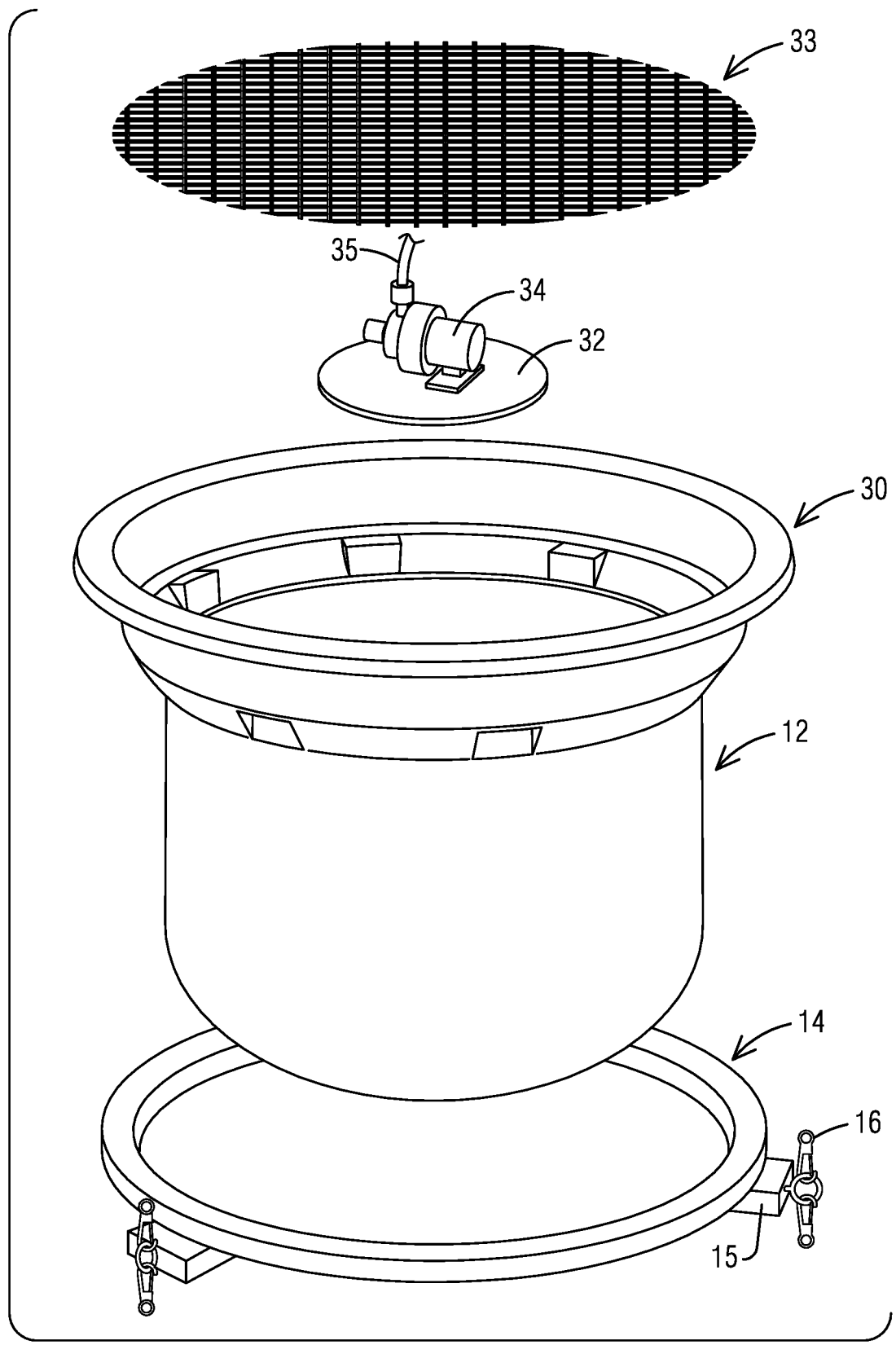
FIG. 3 is an exploded perspective of a reservoir pot of FIG. 1.

Referring to the drawings FIGS. 1 through 7 and especially to FIGS. 1 to 3, a closed drip recirculating hydroponic system 10 is shown. The hydroponic system 10 on FIG. 1 may be utilized alone or as a module of an expanded system. The hydroponic system 10 has a plurality of vertically suspended pots 11 and a collection reservoir 12. The growing pots 11 are shown filled with plants 13. Each growing pot 11 and the reservoir 12 are supported with a pot supporting ring 14 having a plurality of flanges 15 having attachment rings 16 thereon. Each attachment ring 14 is supported by a plurality of vertically extending chains 17 or the like. The attachment ring 16 of each pot supporting ring 14 is attached to the chain 17 at set locations to space each growing pot 11 from each adjacent growing pot 11 with the reservoir 12 being below the last pot. The top growing pot 18 is also seen as being directly below the water emitter 20, which may be a drip dispensing nozzle and emits water with dissolved nutrients into the top pot 18. The pot supporting chains 17 are attached to a supporting plate 21 with snap fasteners 22. The plate 21 is gimbaled with gimbal 23 to a supporting bracket 24 which is attached to a supporting line or cable 25 as more clearly seen in FIG. 5. A snap hook 26 connects the gimbal to the bracket 24. The bracket 24 also supports the main water line 27 with a clamp 28. A feeder water line 36 feeds the emitter 20 from the main water line 27.

As seen more clearly in FIG. 2, each growing pot 11 has an arcuate shaped rim 30 shaped for the pot supporting ring 14 to fit into for removably supporting a growing pot 11 therein. The pot supporting ring 14 is supported on the chains 17 to thereby allow an individual pot 11 or the reservoir 12 to be individually removed, and replaced without disturbing the operation of the system.

Figure 4:
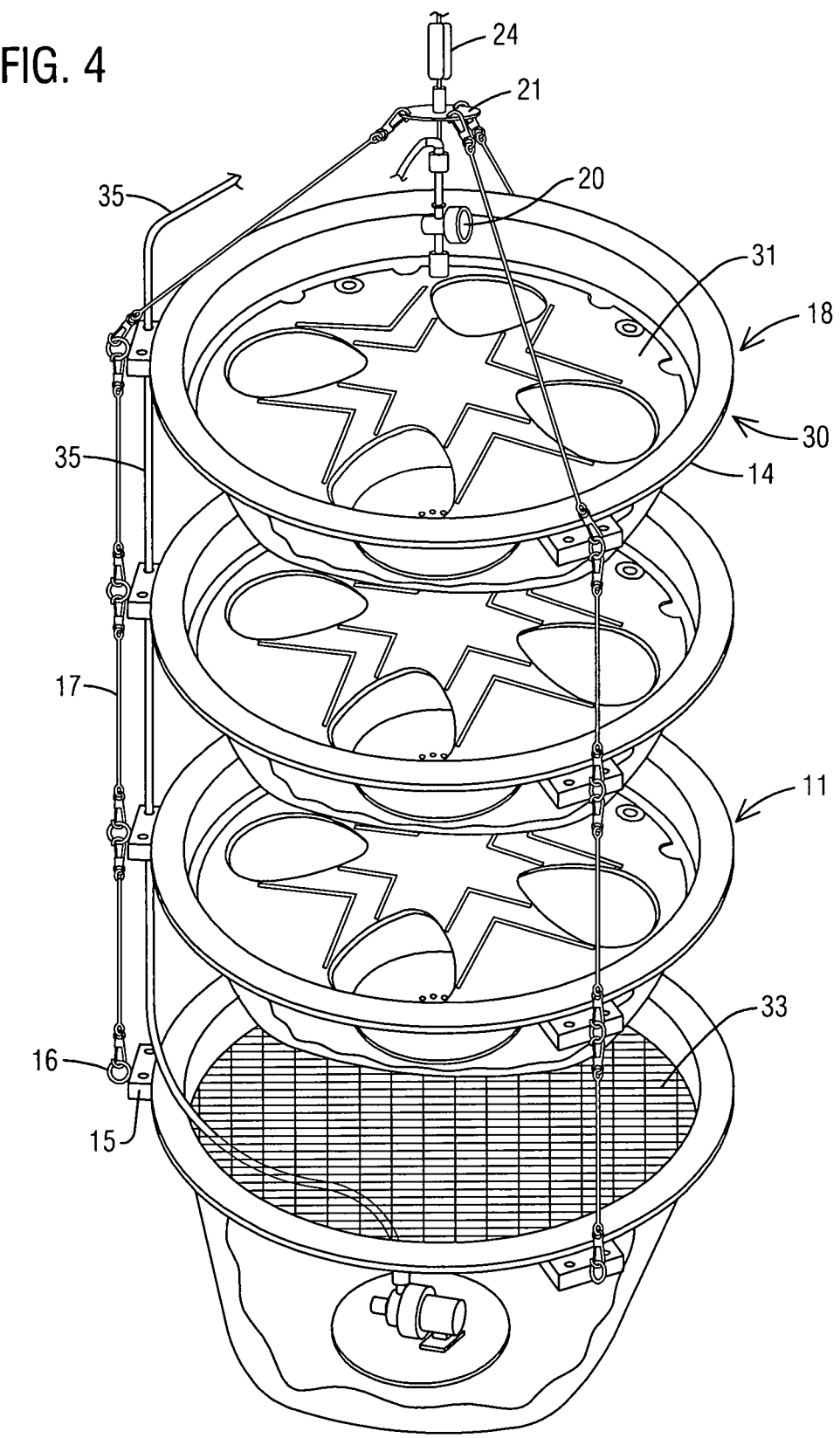
FIG. 4 is an exploded perspective of one module of the present hydroponic system.

As seen in FIG. 4, the top planter pot 18 is mounted just below the adjustable water emitter 20. The emitter directs the water directly against a diverter plate 31 mounted in each growing pot 11. The diverter plate 31 distributes the water and nutrients to the plants in the growing pots 11 and 18 and helps maintain moisture on the plants growing in the growing pot and also helps support the plants in the growing pots 11 and 18. Each pot also has an overflow drain plate 32 which allows the water to stay in each growing pot and overflow to the next growing pot and finally into the reservoir 12. The reservoir 12 has a filter screen 33 over the top.

As seen in FIG. 3, the reservoir 12 has an annular curled rim shaped for an annular pot supporting ring 14 to fit into for supporting the reservoir 12. The reservoir 12 has a filter screen 33 covering the open top and has an overflow drain 32 which allows an overflow of any accumulated liquid to flow out the bottom of the reservoir onto the ground beneath. However, a pump 34 pumps accumulated liquid in the reservoir through a riser tube 35 as seen in FIG. 4 back to the emitter 20 and top-most growing pot 18 for recycling the liquid. The reservoir 12 can easily be removed from the system by lifting it from the ring 14 in which case the water would fall to the ground below.

Figure 5:
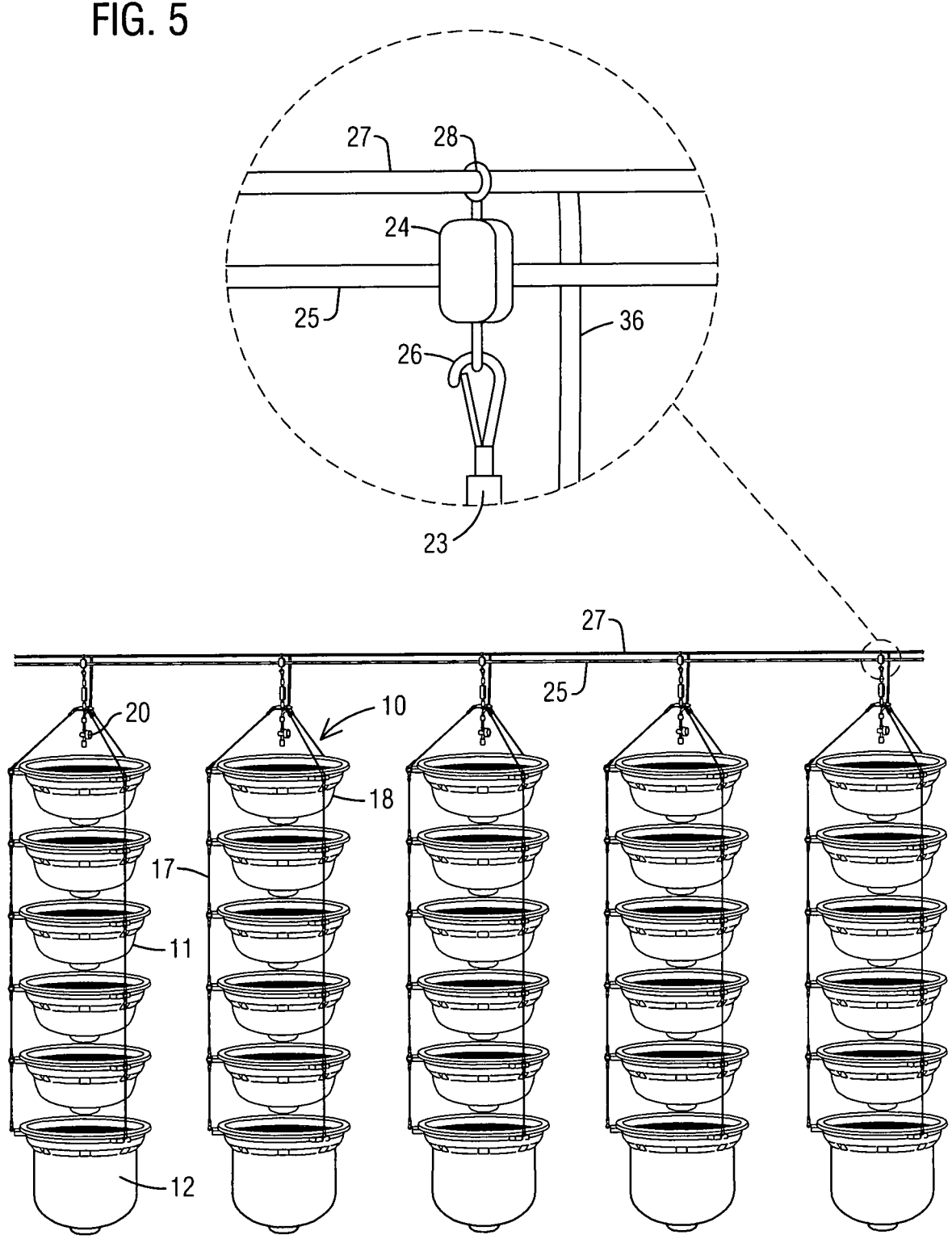
FIG. 5 is a side elevation of a hydroponic system in accordance with the present invention using multiple modules of FIG. 1.

FIG. 5 shows the present modular hydroponic system in a matrix in which a plurality of hydroponic modules 10 of FIGS. 1-4 have been integrated into a matrix in a more large scale growing system. The individual modules 10 can be added or taken away from the system without interfering with the whole system and individual growing pots 11 or reservoirs 12 can be removed or replaced as needed without interfering with operation of the growing system. The system can be scaled back or enlarged to handle smaller or larger numbers of modules 10 or growing pots 11 as desired. A larger system of this type may have the water gravity fed or may have a pump to pump the nutrient containing water from a large reservoir to the individual modules.

Figure 6:
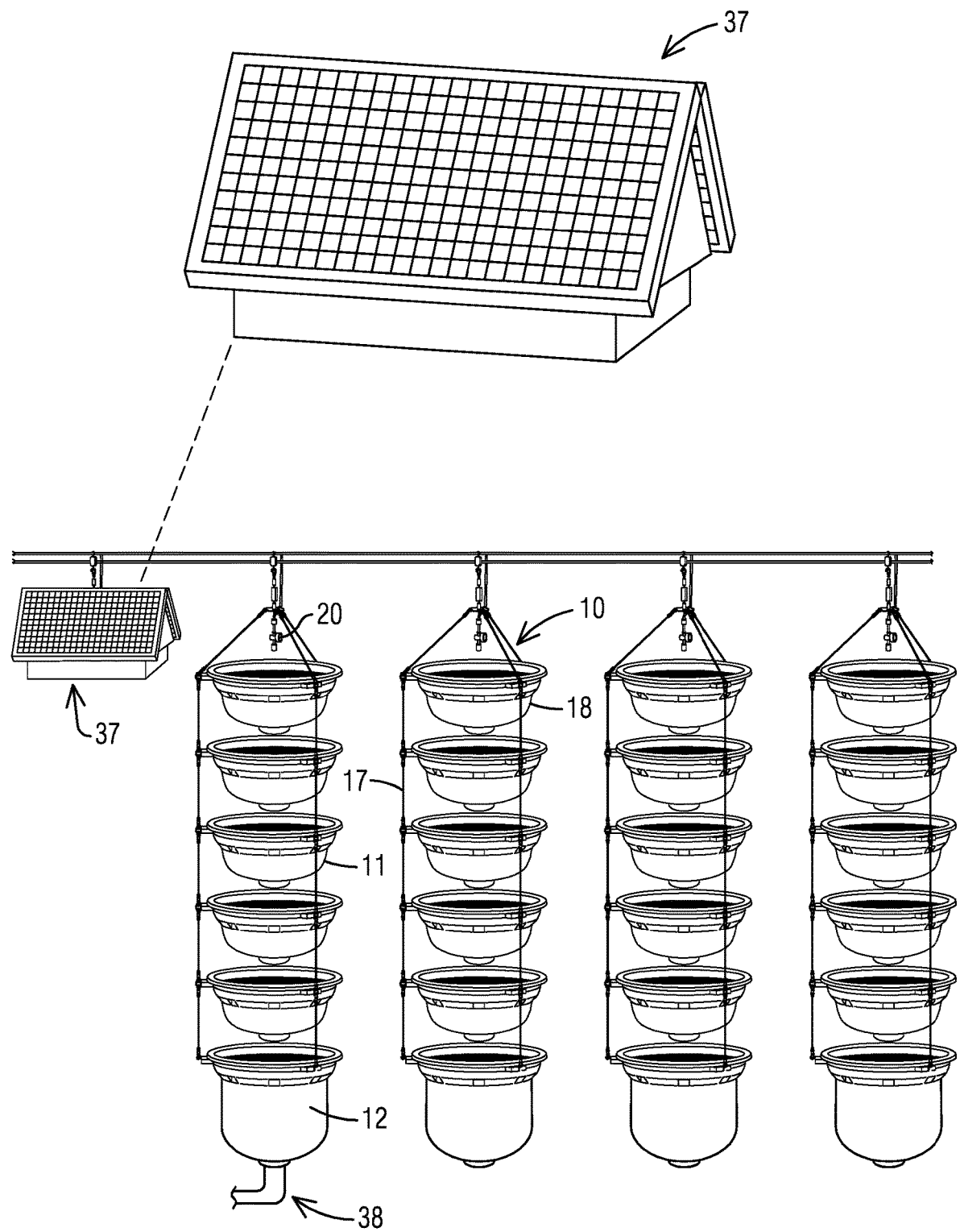
FIG. 6 is a side elevation of a hydroponic system in accordance with the present invention operated with solar energy.

FIG. 6 illustrates the hydroponic growing system in accordance with FIG. 5 but having a solar power option with a solar collector 37 providing the power for the pumps. The solar collector can be seen to provide the electricity to the reservoir pumps through electric lines 38. The solar collector may be suspended in the air on the support cable 25 for the system. Solar power is a convenient way of powering the system in areas that do not have convenient access to electricity.

Figure 7:
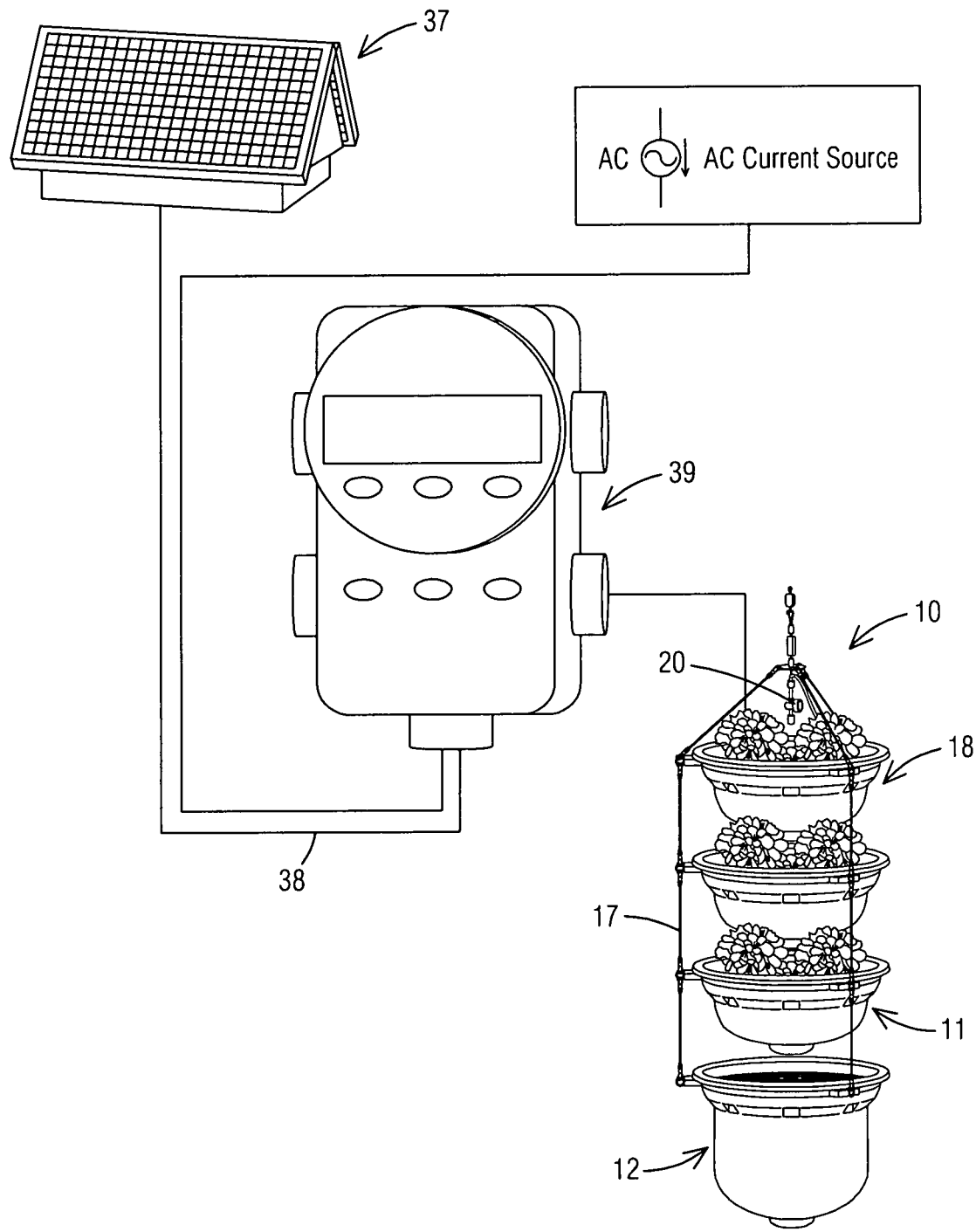
FIG. 7 is a side elevation of one module of a hydroponic system in accordance with the present invention using both a time and solar energy.

FIG. 7 is for the hydroponic growing system of FIG. 6 but incorporating electronic controls to operate the system. In a typical system the electronics may only be a timer 39 to control the amount of water being fed to the system. The timer unit 39 is used to regulate the water flow.

It should be clear at this time that a modular hydroponic growing system having one or a plurality of modules, each module having a plurality of removably supported growing pots suspended vertically one above the other has been provided. However the present invention is not to be considered limited to the forms shown which are to be considered illustrative rather than restrictive.

I claim:

1. A hydroponic system comprising:
   a plurality of pot supporting rings each pot supported ring being vertically suspended on a plurality of support lines in a spaced relationship to each other;
   a plurality of plant growing pots, each plant growing pot having a rim shaped to fit onto one of said plurality of pot supporting rings and being removably held in one of said plurality of pot supporting rings, each pot having a discharge therefrom into the next lower suspended pot; and
   a water emitter positioned above the top-most of said plurality of plant growing pots for discharging water into said top-most vertically suspended plant growing pot with excess water being let out through said discharge into the next lower plant growing pot;

whereby the hydroponic system has a plurality of vertically supported plant growing pots, each being removable from the hydroponic growing system.

2. The hydroponic system in accordance with claim 1 including a water reservoir pot having a rim shaped to fit onto one of said plurality of suspended rings and removably supported in the bottom pot supported ring.

3. The hydroponic system in accordance with claim 2 in which said water reservoir pot has a water pump therein adapted to pump water collected therein to said top-most plant growing pot.

4. The hydroponic system in accordance with claim 3 in which a tube connects said water reservoir pot water pump to said water emitter for emitting into said top plant growing pot.

5. The hydroponic system in accordance with claim 3 in which said water reservoir pot has a filter screen therein for filtering water being collected therein.

6. The hydroponic system in accordance with claim 1 in which each said plant growing pot has a dispersion plate mounted therein to disperse water being emitted therein.

7. The hydroponic system in accordance with claim 1 in which each said plant growing pot rim is an annular curled rim sized for one said pot supporting ring to fit therein.

8. The hydroponic system in accordance with claim 1 in which each pot supporting ring has a plurality of flanges extending therefrom each connected to one said supporting line.

9. The hydroponic system in accordance with claim 1 having a main water line connected to said emitter.

10. The hydroponic system in accordance with claim 9 having a plurality of vertical ring supported plant pots each connected to said main water line.

11. The hydroponic system in accordance with claim 3 having a solar panel for collecting sunlight and producing electricity for operating said reservoir pump.

12. The hydroponic system in accordance with claim 9 having a timer connected to said main water line to control the flow of water to said emitter.

13. The hydroponic system in accordance with claim 1 in which each of said plurality of pot supporting rings is a chain supported from a support located above said top-most growing pot.

14. A modular hydroponic system comprising:
a plurality of hydroponic modules, each module having:
a plurality of pot supporting rings each pot supporting ring being suspended vertically on a plurality of support lines in a spaced relationship to each other; and
a plurality of plant growing pots, each plant growing pot having a rim shaped to fit onto one of said plurality of pot supporting rings and being removably supported in one of said plurality of pot supporting rings, each plant growing pot having a discharge therefrom into the next lower plant growing pot; and
a water emitter positioned above the top-most of said plurality of plant growing pots for discharging water into said top-most of said plurality of plant growing pots with any excess water being let out through said discharge into the next lower pot;
an overhead module support removably supporting each of a plurality of said modules;
an overhead main water line operatively connected to each module water emitter; and
a water flow timer operatively connected to said main water line to provide a timed operation for feeding water to said plurality of modules.

15. A modular hydroponic system in accordance with claim 14 in which each said module plant growing pot rim is an annular curled rim sized for one said pot supporting ring to fit therein.

16. A modular hydroponic system in accordance with claim 14 in which each said module has a water reservoir pot as the bottom-most pot of each said module for collecting water discharged from said last plant going pot.

17. A modular hydroponic system in accordance with claim 14 in which said modular hydroponic system has a solar panel for collecting sunlight and producing electricity for operating said timer.

18. A modular hydroponic system in accordance with claim 14 in which each said overhead module support is a supporting cable supporting a plurality of modules thereon.

* * * * *